(12) United States Patent
Bull et al.

(10) Patent No.: US 6,328,780 B1
(45) Date of Patent: Dec. 11, 2001

(54) FOLIAR FERTILIZERS

(75) Inventors: Barrett Clifford Bull, Hazelwood Park; Ian David Kaehne, Belair, both of (AU)

(73) Assignees: Hi-Fert Pty LTD, Keswick; Springbrook Nominees, Pty LTD, Urley, both of (AU)

( * ) Notice: Subject to any disclaimer, the term of this patent is extended or adjusted under 35 U.S.C. 154(b) by 0 days.

(21) Appl. No.: 09/269,546

(22) PCT Filed: Sep. 29, 1997

(86) PCT No.: PCT/AU97/00646

§ 371 Date: Mar. 26, 1999

§ 102(e) Date: Mar. 26, 1999

(87) PCT Pub. No.: WO98/14412

PCT Pub. Date: Apr. 9, 1998

(30) Foreign Application Priority Data

Sep. 30, 1996 (AU) .......................................................... 2678

(51) Int. Cl.[7] .................................................... C05D 9/00
(52) U.S. Cl. ...................................................... 71/31; 71/63
(58) Field of Search ................................. 71/31, 63, 11; 47/62, 48.5

(56) References Cited

U.S. PATENT DOCUMENTS

| 4,043,788 | * | 8/1977 | Fryer | ........................ 71/29 |
| 4,395,273 | | 7/1983 | Leutner et al. . | |
| 4,505,732 | * | 3/1985 | Aigner et al. | ............................ 71/11 |
| 4,589,906 | * | 5/1986 | Brunn et al. | ............................... 71/80 |
| 4,867,779 | * | 9/1989 | Meunier et al. | ........................ 71/62 |
| 5,037,470 | * | 8/1991 | Matzen et al. | ........................... 71/52 |
| 5,201,930 | * | 4/1993 | Campbell | ................................. 71/23 |
| 5,234,892 | | 8/1993 | Dunaway, Sr. . | |

FOREIGN PATENT DOCUMENTS

| 9100645 | 4/1993 | (AT) . |
| 35179/78 | 6/1982 | (AU) . |
| 3427980 | 7/1984 | (DE) . |
| 2092562 | 8/1982 | (GB) . |
| WO 91/09818 | 7/1991 | (WO) . |

OTHER PUBLICATIONS

*Chemical Abstracts*, 117: p. 710, 1992. (Abstract only).
19–Fer., *Soils, Plant Nutr.*, 113: p. 683, 1990. (Abstract only).
*Chemical Abstracts*, 74: p. 370, 1971. (Abstract only).

* cited by examiner

*Primary Examiner*—Wayne Langel
*Assistant Examiner*—Eileen E. Nave
(74) *Attorney, Agent, or Firm*—Henry D. Coleman; R. Neil Sudol; William J. Sapone

(57) ABSTRACT

A foliar fertiliser composition providing for an enhanced crop characteristic in a crop. The composition is made of soluble compounds of the following trace elements in the following ranges of relative proportions of the respective element by weight, 0.5 to 4.0 copper, 2.0 to 10.0 zinc, 2.5 to 12 manganese, 5 to 14.0 iron, 0.5 to 6.5 boron, 0 to 0.3 molybdenum.

81 Claims, No Drawings

FOLIAR FERTILIZERS

RELATED APPLICATIONS

This application is a § 371 national phase filing of PCT/AU97/00646, having an international filing date of Sep. 29, 1997.

FIELD OF THE INVENTION

This invention relates to a foliar fertiliser composition, including a combination of trace elements and a method for foliar fertilisation of plants using the foliar fertiliser composition.

BACKGROUND TO THE INVENTION

An aim of agriculture since the earliest of times has been to enhance the capacity of agricultural crops. Various activities have been undertaken to enhance the growth rate and yield of plants and the quality of the crop produced. Various fertilisers have been used ranging from various animal manures to relatively purified chemical substances to assist the delivery of elements required for plant growth.

It has long been recognised that in addition to carbon, oxygen and hydrogen, various elements are required in relatively different amounts to achieve enhancement of plant capacity. Those elements required in relatively larger amounts are usually designated the major nutrients which are usually subgrouped further into those of greatest requirement; nitrogen, phosphorous and potassium and a second group; sulphur, calcium, magnesium, sodium and chlorine. The elements which were found to be required in relatively smaller amounts are usually designated the trace elements of which the principal ones are copper, zinc, manganese, iron, boron and molybdenum.

Furthermore it has been recognised that crops have two general states of requirement of the major elements. Firstly, plants must absorb sufficient of an element, supplied by fertiliser application if necessary, to alleviate symptoms resulting from a deficiency of supply of the element. Secondly, crops may be further enhanced by positive responses of growth rate, yield and quality resulting from the supply to and absorption by the plant of quantities of elements exceeding those required to alleviate symptoms of deficiencies. Plants growing in this second state will have generally been supplied with sufficient of all the major elements to remove them from a condition of deficiency.

It has also long been recognised that in certain soil types and for certain plants symptoms of deficiencies are linked to an under supply of various trace elements. A practice has developed to diagnose these deficiencies and address specific instances of trace element insufficiency as they occur by supplying additional quantities of one or more trace elements.

The various formulations of nutritional substances used to deliver prescribed quantities of major elements and address specific instances of diagnosed deficiencies of trace elements are generally applied directly to the soil or solubilised (or suspended) for foliar application. The application by foliar fertilisation reduces the risk of any elements within the nutritional substance being complexed with a constituent of the soil, thereby allowing a more accurate application of required elements and avoiding ineffectual applications of components of the fertilising substance. As a consequence, fertilising substances containing trace elements applied to soil tend to be quite different from those used for foliar application and are focussed towards generally changing the availability of a trace element in a particular soil rather than primarily focussing upon the trace element nutrition of a particular crop. The complexing of trace elements with soil constituents and physical dispersal within a soil dictates that applications to soil are usually an order of magnitude greater per area than for foliar fertlisers.

A limitation of foliar application of nutritional substances is the maximum rate of a specific substance which can be applied without causing leaf tissue damage.

The application of trace elements to agricultural crops has been largely to prevent further appearance of or to rectify an actual trace element deficiency and has not been used in the more general sense to enhance crop yield or quality characteristics of specific crops in conditions where trace element deficiencies have been counteracted or in conditions which are regarded as generally favourable for the growth of particular crops in terms of being sufficient in trace elements.

Some fertilisers do incorporate multi trace element combinations as an adjunct but at relatively low levels. A number of others use multi trace element supplements in very atypical circumstances such as where soil-less media are used. A number of patent disclosures are pertinent to such situations. U.S. Pat. No. 4,455,161 to Cohen et al is a multi trace element formulation particularly useful for potted plants in a soil-less medium. Cohen proposes formulations which do not contain boron and specify an iron : manganese ratio which is not necessary for effective foliar fertiliser formulations, and also which require gypsum. U.S. Pat. No. 4,328,025 to Whitcomb also relates to a multi trace element mixture. The formulations disclosed specify a higher proportion of iron for a plant growing in medium for container grown plants than the compositions of the present invention.

Other documents relate to foliar fertilisers and are often concerned with aspects of maintaining solubility. U.S. Pat. No. 4,505,732 to Aigner et al is concerned with the manner in which combinations of trace elements and the secondary major element, magnesium, can be maintained in soluble form to redress deficiencies and inadequate supply of magnesium and the trace elements, manganese and boron in particular. A proposed formulation was partially successful in relieving manganese deficiency in plants grown in a soil of known lower status for manganese supply. U.S. Pat. No. 4,395,273 to Leutner et al relates to a simple process for preparation of multi trace element fertlisers containing magnesium and including chelates of N-carboxyalkylaminoacids as a means of facilitating the preparation of the multi trace element formulation. This specification does however not disclose elevated application rates, nor is the efficacy of the compositions tested. U.S. Pat. No. 5,514,201 to Marijuan De Santiago et al. discloses the process for forming a deficiency correcting substance containing magnesium and principally three trace elements (iron, manganese and zinc) but it contains no boron or molybdenum.

To the best knowledge of the present inventors there has been no disclosure of a foliar fertilising composition or method of fertilising that provides beneficial effects which are substantially independent of the soil type and that give a substantially consistent enhancement in a large range of crops and across cultivars of a crop.

OBJECT OF THE INVENTION

It is an object of the present invention to provide a foliar fertiliser composition incorporating a combination of trace elements that acts to enhance a characteristic of a crop which may be the yield and/or quality of the crop.

SUMMARY OF THE INVENTION

It has been found that significant increases in growth, or increases in yield or enhancement of certain qualities of an agricultural crop can be achieved where particular combinations of trace elements are administered as a foliar application.

It has been found that a crop is enhanced by a relatively specific combination of trace elements and also it has been found that such specific combinations are substantially consistent in their enhancing effects from soil type to soil type, except perhaps where the physical nature of the soil is such that it is unsuitable for the crop. For example, where a specific composition is used on potatoes the enhanced characteristic such as yield and proportion of more desirable tubers occurs in loamy and sandy soils with or without clay subsoil and irrespective of the variety propagated.

It also has been found that where compositions of trace elements in accordance with this invention are applied to foliage the rate of total trace elements per application can be higher than is applied under current practice without causing significant leaf tissue damage. Normally various toxicity effects become evident where the rate of application of trace elements exceeds a certain level and these toxic effects are generally more pronounced on foliar application than when the trace elements are applied to soil Throughout this specification reference will be made to the proportion of certain trace elements within the composition. The reference to weight in this specification means elemental weights, thus for example, the weight of elemental copper in copper sulphate.

In a broad form but not necessarily the broadest or only form the invention could be said to reside in a foliar ferliliser composition providing for a substantially consistent enhancement of a crop characteristic of a crop, said composition including soluble compounds of the following trace elements in the following ranges of relative proportions of the respective element by weight, 0.5 to 4.0 copper, 2.0 to 10.0 zinc, 2.5 to 12 manganese, 5 to 14.0 iron, 0.5 to 6.5 boron, 0 to 0.3 molybdenum.

An enhanced crop characteristic resulting from treatment of a crop with the composition of the present invention has been found to be substantially consistent. These formulations will elicit the enhanced characteristic in a crop when the crop is grown under conditions conducive to growth of the particular crop, on a consistent basis. This consistency is found notwithstanding variation of soil type and notwithstanding variation of cultivar forms within the crop. However, on occasion there may be a failure to elicit the enhanced crop characteristic even under suitable growth conditions.

The consistency will not be found however where growth of a crop is attempted in conditions unsuited for the crop. Thus the consistency will not be exhibited where the soil has a marked deficiency in a trace element or other nutrient required by the crop, where climatic conditions are severe, such as with the onset of a drought, or if growth is attempted in a climate or during a season not suited to the crop concerned. Similarly consistency, will not be found where the soil is contaminated, for example, with high salt levels.

It has been found that molybdenum need not necessarily be used to gain an enhanced crop characteristic, however in the trials to date, where molybdenum was added, there was a greater improvement.

The crop characteristic may be yield, thus with application of the foliar fertiliser composition greater yields may be obtained. Alternatively the crop characteristic may be the growth rate of the plant so that with application the plant grows more quickly, or the characteristic may be a quality of the crop which is enhanced after application.

Preferably the relative proportion by elemental weight of the composition comprising the sum of the zinc and manganese of the above broad form is in a range between 8.0 and 16.0 expressed as a percentage by weight of total soluble trace element compound solids.

Preferably citric acid is included to stabilise the composition in powder or liquid form in the broad form at a relative percentage by weight of total soluble solids in the range between 0.5 and 4.5 and more preferably in the range between 1.5 to 3.5.

Preferably a surfactant is used and more preferably the surfactant is a non-ionic surfactant which will be a solid in a dry mix.

Preferably the range of the non-ionic surfactant is present at a relative proportion by weight in the range between 0.25 and 1.5 expressed as a percentage weight of total soluble solids, and most preferably about 0.4. One example of such a solid non-ionic surfactant is an alkyl polyethylene glycol ester, two examples of ones that have been used are sold under the trade names Lutensol™ AT 25, and Lutensol™ 50 by BASF AG of Germany.

The soluble compounds of the trace elements can be selected from available soluble sources and are commonly sulphates or acids. The preferred sources of the trace elements found to date are as listed in the table below:

| Trace elements | Salt/Acid | % element |
| --- | --- | --- |
| Copper | $CuSO_4.5H_2O$ | 25.35 |
| Zinc | $ZnSO_4.1H_2O$ | 36.25 |
| Manganese | $MnSO_4.1H_2O$ | 32.30 |
| Iron | $FeSO_4.7H_2O$ | 19.99 |
| Boron | $H_3BO_3$ | 17.39 |
| Molybdenum | $Na_2MoO_4.2H_2O$ | 39.45 |

The percentage of element calculated is based on a source of the compound with a nominal 99.5% purity.

A particular trace element composition usually will be supplied in dry form for ease of transportation. Water can be added on site and the composition dissolved at an appropriate concentration and then applied to the crop.

It is found possible to apply the trace elements at a rate much higher than is common practice so that the trace elements can be applied per application at a rate as high as 9.0 kg/ha total trace elements. However, beneficial effects may be still be observed at rates of application of 1.2 kg/ha. The application rate generally used falls within the range of 1.2 kg/ha to 6 kg/ha, however the majority of rates applied fall within the range of 1.4 kg/ha to 4 kg/ha It will be understood that these represent the cumulative elemental weight of trace elements in the applied composition.

It is possible to extend the time over which an application can be made so that the application may be administered in a cumulative fashion over a short period of time, which might be extended to, for example, a period of two weeks.

It has been found that a crop species benefits from a composition containing proportions of trace elements which differs from the proportions which benefit another crop species. As a consequence, the ranges of trace elements used in one crop type may vary when compared with a different crop type.

In a first specific form the invention could be said to reside in a foliar fertiliser composition providing for a substantially consistent enhancement of a crop characteristic in canola, said composition including soluble salts of the following trace elements in the following ranges of relative proportions of the respective element by weight, from 0.52 to 1.22 copper, from 6.74 to 10.00 zinc, from 5.23 to 8.71 manganese, from 6.53 to 10.89 iron, from 1.05 to 2.42 boron, and from 0.00 to 0.05 molybdenum.

Preferably in this first specific form copper is present proportionately in the range from 0.65 to 1.09 of elemental weight, and boron is present proportionately within the range from 1.30 to 2.16, of elemental weight.

More preferably in this first specific form the composition of trace elements are present proportionately within the following ranges of elemental weight, from 0.77 to 0.97 copper, from 7.90 to 9.70 zinc, from 6.13 to 7.81 manganese, from 7.67 to 9.76 iron, from 1.52 to 1.94 boron, and from 0.00 to 0.045 molybdenum.

In a second specific form the invention could be said to reside in a foliar fertiliser composition providing for a substantially consistent enhancement of a crop characteristic for some pulses, the pulses not including lupins, soybeans, mung beans, navy beans, azuki beans, and peanuts, said composition including soluble salts of the following trace elements in the following ranges of relative proportions of the respective element by weight, from 0.84 to 1.96 copper, from 5.29 to 8.81 zinc, from 3.71 to 6.18 manganese, from 7.40 to 12.34 iron, from 0.84 to 1.96 boron, and from 0 to 0.088 molybdenum.

Preferably in this second specific form copper is present proportionately in the range from 1.05 to 1.75 of elemental weight, and boron is present proportionately within the range from 1.05 to 1.75 of elemental weight.

More preferably in this second form the trace elements are present proportionately within the following ranges from of elemental weight 1.23 to 1.57 copper, from 6.20 to 7.90 zinc, from 4.35 to 5.53 manganese, from 8.68 to 11.05 iron, from 1.23 to 1.57 boron, and from 0 to 0.078 molybdenum.

In a third specific form the invention could be said to reside in a foliar fertiliser composition providing for a substantially consistent enhancement of a crop characteristic for lupins, said composition including soluble salts of the following trace elements in the following ranges of relative proportions of the respective element by weight from 0.60 to 1.40 copper, from 5.28 to 8.80 zinc, from 3.02 to 5.03 manganese, from 7.54 to 12.56 iron, from 1.20 to 2.80 boron, and from 0 to 0.088 molybdenum.

Preferably in this third specific form copper is present proportionately in the range from 0.75 to 1.25 of elemental weight, and boron is present proportionately within the range from 1.50 to 2.50 of elemental weight.

More preferably in this third form the trace elements are present proportionately within the following ranges of elemental weight, from 0.88 to 1.12 copper, from 6.20 to 7.89 zinc, from 3.54 to 4.5 manganese, from 8.84 to 11.26 iron, from 1.76 to 2.24 boron, and from 0 to 0.078 molybdenum.

In a fourth specific form the invention could be said to reside in a foliar fertiliser composition providing for a substantially consistent enhancement of a crop characteristic for potatoes, said composition including soluble salts of the following trace elements in the following ranges of relative proportions of the respective element by weight from 0.76 to 1.76 copper, from 2.00 to 3.15 zinc, from 6.62 to 11.03 manganese, from 6.62 to 11.04 iron, from 1.51 to 3.53 boron, and from 0 to 0.04 molybdenum.

Preferably in this fourth specific form copper is present proportionately in the range from 0.95 to 1.58 of elemental weight, and boron is present proportionately within the range from 1.89 to 3.15 of elemental weight.

More preferably in this fourth form the trace elements are present proportionately within the following ranges of elemental weight; from 1.11 to 1.41 copper, from 2.22 to 2.82 zinc, from 7.76 to 9.88 manganese, from 7.77 to 9.89 iron, from 2.22 to 2.82 boron, and from 0 to 0.034 molybdenum.

In a fifth specific form the invention could be said to reside in a foliar fertiliser composition providing for a substantially consistent enhancement of a crop characteristic for lucerne seed crop, said composition including soluble salts of the following trace elements in the following ranges of relative proportions of the respective element by weight; from 0.75 to 2.40 copper, from 4.67 to 7.78 zinc; from 2.80 to 4.66 manganese, from 7.47 to 12.45 iron, from 1.49 to 3.49 boron, and from 0 to 0.075 molybdenum.

Preferably in this fifth specific form copper is present proportionately in the range from 0.94 to 2.10 of elemental weight, and of boron is present proportionately within the range from 1.87 to 3.11 of elemental weight.

More preferably in this fifth form the trace elements are present proportionately within the following ranges of elemental weight: from 1.1 to 1.4 copper, from 5.47 to 6.97 zinc, from 3.00 to 4.18 manganese, from 8.77 to 11.16 iron, from 2.05 to 2.79 boron, and from 0 to 0.067 molybdenum.

In a sixth specific form the invention could be said to reside in a foliar fertiliser composition providing for a substantially consistent enhancement of a crop characteristic for corn, said composition including soluble salts of the following trace elements in the following ranges of relative proportions of the respective element by weight; from 0.6 to 1.40 copper, from 4.20 to 9.80 zinc, from 2.56 to 4.90 manganese, from 5.05 to 8.12 iron, from 1.02 to 2.38 boron, and from 0 to 0.06 molybdenum.

Preferably in this sixth specific form the trace elements are present in the following ranges of relative proportions of the respective element by weight; from 0.75 to 1.25 copper, from 5.25 to 8.75 zinc, from 2.98 to 4.38 manganese, from 5.34 to 7.25 iron, from 1.28 to 2.13 boron and from 0.03 to 0.05 molybdenum.

In a seventh specific form the invention could be said to reside in a foliar fertiliser composition providing for a substantially consistent enhancement of a crop characteristic for grape vines, said composition including soluble salts of the following trace elements in the following ranges of relative proportions of the respective element by weight; from 1.0 to 2.34 copper, from 2.0 to 4.66 zinc, from 3.2 to 7.46 manganese, from 5.04 to 8.40 iron, from 2.3 to 5.36 boron, and from 0 to 0.03 molybdenum.

Preferably in this seventh specific form the trace elements are present in the following ranges of relative proportions of the respective element by weight; from 1.25 to 2.09 copper, from 2.5 to 4.16 zinc, from 4.0 to 6.66 manganese, from 5.52 to 7.50 iron, from 2.87 to 4.79 boron and from 0.01 to 0.03 molybdenum.

In an eighth specific form the invention could be said to reside in a foliar fertiliser composition providing for a substantially consistent enhancement of a crop characteristic for cotton, said composition including soluble salts of the following trace elements in the following ranges of relative proportions of the respective element by weight; from 0.8 to 1.86 copper, from 3.36 to 7.84 zinc, from 2.50 to 5.82 manganese, from 6.0 to 14.0 iron, from 1.36 to 3.18 boron, and from 0 to 0.17 molybdenum.

Preferably in this eighth specific form the trace elements are present in the following ranges of relative proportions of the respective element by weight; from 1.0 to 1.66 copper, from 4.2 to 7.0 zinc, from 3.12 to 5.2 manganese, from 7.5 to 12.5 iron, from 0.09 to 0.15 boron and from 0.03 to 0.05 molybdenum.

In a ninth specific form the invention could be said to reside in a foliar fertiiser composition providing for a substantially consistent enhancement of a crop characteristic for sugar cane, said composition including soluble salts of the following trace elements in the following ranges of relative proportions of the respective element by weight; from 0.6 to 1.40 copper, from 3.6 to 8.4 zinc, from 4.2 to 9.8 manganese, from 5.4 to 12.6 iron, from 0.81 to 1.89 boron, and from 0 to 0.07 molybdenum.

Preferably in this ninth specific form the trace elements are present in the following ranges of relative proportions of the respective element by weight; from 0.75 to 1.25 copper, from 4.5 to 7.5 zinc, from 5.25 to 8.75 manganese, from 6.75 to 11.25 iron, from 1.01 to 1.69 boron and from 0.02 to 0.04 molybdenum.

In a tenth specific form the invention could be said to reside in a foliar fertiliser composition providing for a substantially consistent enhancement of a crop characteristic for tomato plants, said composition including soluble salts of the following trace elements in the following ranges of relative proportions of the respective element by weight; from 0.6 to 1.40 copper, from 3.18 to 7.42 zinc, from 5.58 to 12.0 manganese, from 5.04 to 11.2 iron, from 1.50 to 3.5 boron, and from 0 to 0.07 molybdenum.

Preferably in this tenth specific form the trace elements are present in the following ranges of relative proportions of the respective element by weight; from 0.75 to 1.25 copper, from 3.98 to 6.63 zinc, from 6.98 to 10.7 manganese, from 6.0 to 10.0 iron, from 1.88 to 3.13 boron and from 0.04 to 0.06 molybdenum.

In an eleventh specific form the invention could be said to reside in a foliar fertiliser composition providing for a substantially consistent enhancement of a crop characteristic for cereals, said composition including soluble salts of the following trace elements in the following ranges of relative proportions of the respective element by weight; from 0.95 to 3.26 copper, from 3.3 to 7.43 zinc, from 5.52 to 11.96 manganese, from 5.03 to 9.75 iron, from 0.5 to 0.91 boron, and from 0 to 0.06 molybdenum.

Preferably in this eleventh specific form the trace elements are present in the following ranges of relative proportions of the respective element by weight; from 1.58 to 2.63 copper, from 4.13 to 6.88 zinc, from 6.9 to 11.5 manganese, from 6.0 to 9.38 iron, from 0.57 to 0.81 boron and from 0.03 to 0.05 molybdenum.

Preferably the cereal to which this eleventh specific form of the invention is applied to is selected from the group comprising wheat, barley, rice, oats, cereal rye and triticale.

In a twelfth specific form the invention could be said to reside in a foliar fertiliser composition providing for a substantially consistent enhancement of a crop characteristic for soybean, said composition including soluble salts of the following trace elements in the following ranges of relative proportions of the respective element by weight; from 0.88 to 2.04 copper, from 3.05 to 7.11 zinc, from 2.83 to 6.61 manganese, from 6.0 to 14.0 iron, from 2.05 to 4.77 boron, and from 0 to 0.08 molybdenum.

Preferably in this twelfth specific form the trace elements are present in the following ranges of relative proportions of the respective element by weight; from 1.10 to 1.83 copper, from 3.81 to 6.35 zinc, from 3.54 to 5.90 manganese, from 7.50 to 12.50 iron, from 2.56 to 4.26 boron and from 0.04 to 0.07 molybdenum.

In a thirteenth specific form the invention could be said to reside in a foliar fertiliser composition providing for a substantially consistent enhancement of a crop characteristic for mung bean, said composition including soluble salts of the following trace elements in the following ranges of relative proportions of the respective element by weight; from 1.50 to 3.50 copper, from 4.16 to 9.72 zinc, from 2.50 to 5.84 manganese, from 5.91 to 13.79 iron, from 1.85 to 4.33 boron, and from 0.00 to 0.28 molybdenum.

Preferably in this thirteenth specific form the trace elements are present in the following ranges of relative proportions of the respective element by weight; from 1.88 to 3.13 copper, from 5.21 to 8.68 zinc, from 3.13 to 5.21 manganese, from 7.39 to 12.31 iron, from 2.32 to 3.86 boron and from 0.15 to 0.25 molybdenum.

In a fourteenth specific form the invention could be said to reside in a foliar fertiliser composition providing for a substantially consistent enhancement of a crop characteristic for citrus, said composition including soluble salts of the following trace elements in the following ranges of relative proportions of the respective element by weight; from 0.60 to 1.40 copper, from 3.78 to 8.82 zinc, from 3.90 to 9.10 manganese, from 5.07 to 9.10 iron, from 1.32 to 3.08 boron, and from 0.00 to 0.12 molybdenum.

Preferably in this fourteenth specific form the trace elements are present in the following ranges of relative proportions of the respective element by weight; from 0.75 to 1.25 copper, from 4.73 to 7.88 zinc, from 4.88 to 8.13 manganese, from 5.85 to 8.13 iron, from 1.65 to 2.75 boron and from 0.06 to 0.10 molybdenum.

In a fifteenth specific form the invention could be said to reside in a foliar fertiliser composition providing for a substantially consistent enhancement of a crop characteristic for brsssica vegetables, said composition including soluble salts of the following trace elements in the following ranges of relative proportions of the respective element by weight; from 0.60 to 1.40 copper, from 3.15 to 7.35 zinc, from 2.63 to 6.13 manganese, from 5.00 to 8.75 iron, from 1.35 to 3.15 boron, and from 0.00 to 0.20 molybdenum.

Preferably in this fifteenth specific form the trace elements are present in the following ranges of relative proportions of the respective element by weight; from 0.75 to 1.25 copper, from 3.94 to 6.56 zinc, from 3.29 to 5.48 manganese, from 5.63 to 7.81 iron, from 1.69 to 2.81 boron and from 0.07 to 0.13 molybdenum.

Preferably the brassica vegetable to which this fifteenth form of the invention is applied to is selected from the group comprising broccoli, cabbage, cauliflower and brussel sprouts.

In a sixteenth specific form the invention could be said to reside in a foliar fertiliser composition providing for a substantially consistent enhancement of a crop characteristic for sorghum, said composition including soluble salts of the following trace elements in the following ranges of relative proportions of the respective element by weight; from 0.60 to 1.40 copper, from 3.60 to 8.40 zinc, from 2.76 to 6.44 manganese, from 5.40 to 12.60 iron, from 0.50 to 1.80 boron, and from 0 to 0.14 molybdenum.

Preferably in this sixteenth specific form the trace elements are present in the following ranges of relative proportions of the respective element by weight; from 0.75 to 1.25 copper, from 4.50 to 7.50 zinc, from 3.45 to 5.75 manganese, from 6.75 to 11.25 iron, from 0.62 to 1.33 boron and from 0.08 to 0.13 molybdenum.

In a seventeenth specific form the invention could be said to reside in a foliar fertiliser composition providing for a substantially consistent enhancement of a crop characteristic for peanuts, said composition including soluble salts of the following trace elements in the following ranges of relative proportions of the respective element by weight; from 0.60 to 1.40 copper, from 3.37 to 7.87 zinc, from 4.20 to 9.80 manganese, from 5.04 to 11.20 iron, from 2.10 to 4.90 boron, and from 0.00 to 0.11 molybdenum.

Preferably in this seventeenth specific form the trace elements are present in the following ranges of relative proportions of the respective element by weight; from 0.75 to 1.25 copper, from 4.22 to 7.03 zinc, from 5.25 to 8.75 manganese, from 6.00 to 10.00 iron, from 2.63 to 4.38 boron and from 0.06 to 0.10 molybdenum.

In an eighteenth specific form the invention could be said to reside in a foliar fertiliser composition providing for a substantially consistent enhancement of a crop characteristic for navy beans, said composition including soluble salts of the following trace elements in the following ranges of relative proportions of the respective element by weight; from 0.60 to 1.40 copper, from 2.01 to 4.07 zinc, from 2.51 to 5.85 manganese, from 5.24 to 12.22 iron, from 0.55 to 1.27 boron, and from 0.00 to 0.18 molybdenum.

Preferably in this eighteenth specific form the trace elements are present in the following ranges of relative proportions of the respective element by weight; from 0.75 to 1.25 copper, from 2.47 to 3.64 zinc, from 3.14 to 5.23 manganese, from 6.55 to 10.91 iron, from 0.68 to 1.14 boron and from 0.10 to 0.16 molybdenum.

In a nineteenth specific form the invention could be said to reside in a foliar fertiliser composition providing for a substantially consistent enhancement of a crop characteristic for macadamia trees, said composition including soluble salts of the following trace elements in the following ranges of relative proportions of the respective element by weight; from 0.6 to 1.40 copper, from 3.30 to 7.70 zinc, from 6.00 to 12.00 manganese, from 5.03 to 10.50 iron, from 1.20 to 2.80 boron, and from 0.00 to 0.03 molybdenum.

Preferably in this nineteenth specific form the trace elements are present in the following ranges of relative proportions of the respective element by weight; from 0.75 to 1.25 copper, from 4.13 to 6.88 zinc, from 7.50 to 11.00 manganese, from 5.63 to 9.38 iron, from 1.50 to 2.50 boron and from 0.01 to 0.03 molybdenum.

In a twentieth specific form the invention could be said to reside in a foliar fertiliser composition providing for a substantially consistent enhancement of a crop characteristic for coffee, said composition including soluble salts of the following trace elements in the following ranges of relative proportions of the respective element by weight; from 1.46 to 2.72 copper, from 2.00 to 3.72 zinc, from 4.39 to 8.15 manganese, from 5.01 to 9.30 iron, from 1.75 to 3.25 boron, and from 0 to 0.04 molybdenum.

Preferably in this twentieth specific form the trace elements are present in the following ranges of relative proportions of the respective element by weight; from 1.67 to 2.51 copper, from 2.29 to 3.43 zinc, from 5.02 to 7.52 manganese, from 5.72 to 8.58 iron, from 2.00 to 3.00 boron and from 0.01 to 0.03 molybdenum.

In a twenty first specific form the invention could be said to reside in a foliar fertiliser composition providing for a substantially consistent enhancement of a crop characteristic for prunus trees, said composition including soluble salts of the following trace elements in the following ranges of relative proportions of the respective element by weight; from 0.60 to 1.40 copper, from 2.10 to 4.90 zinc, from 2.50 to 5.84 manganese, from 5.00 to 11.68 iron, from 1.08 to 2.52 boron, and from 0.00 to 0.01 molybdenum.

Preferably in this twenty first specific form the trace elements are present in the following ranges of relative proportions of the respective element by weight; from 0.75 to 1.25 copper, from 2.63 to 4.38 zinc, from 3.13 to 5.21 manganese, from 6.26 to 10.43 iron, from 1.35 to 2.25 boron and from 0.00 to 0.01 molybdenum.

The prunus tree to which the twenty first specific form of the invention is to be applied may be selected from the group comprising plum, cherry, peach, apricot, nectarine, peacharine and almond.

In a twenty second specific form the invention could be said to reside in a foliar fertiliser composition providing for a substantially consistent enhancement of a crop characteristic for sunflowers, said composition including soluble salts of the following trace elements in the following ranges of relative proportions of the respective element by weight; from 1.57 to 2.91 copper, from 5.01 to 9.31 zinc, from 2.66 to 4.94 manganese, from 5.01 to 9.31 iron, from 2.35 to 4.37 boron, and from 0.00 to 0.05 molybdenum.

Preferably in this twenty second specific form the trace elements are present in the following ranges of relative proportions of the respective element by weight; from 1.79 to 2.69 copper, from 5.73 to 8.59 zinc, from 3.04 to 4.56 manganese, from 5.73 to 8.59 iron, from 2.69 to 4.03 boron and from 0.03 to 0.05 molybdenum.

In a twenty third specific form the invention could be said to reside in a foliar fertiliser composition providing for a substantially consistent enhancement of a crop characteristic for azuld bean, said composition including soluble salts of the following trace elements in the following ranges of relative proportions of the respective element by weight; from 1.23 to 2.28 copper, from 3.43 to 6.37 zinc, from 2.52 to 4.68 manganese, from 5.88 to 10.92 iron, from 1.35 to 2.51 boron, and from 0.00 to 0.12 molybdenum.

Preferably in this twenty third form the trace elements are present in the following ranges of relative proportions of the respective element by weight; from 1.40 to 2.10 copper, from 3.92 to 5.88 zinc, from 2.88 to 4.32 manganese, from 6.72 to 10.08 iron, from 1.54 to 2.32 boron and from 0.07 to 0.11 molybdenum.

In a twenty fourth specific form the invention could be said to reside in a foliar fertiliser composition providing for a substantially consistent enhancement of a crop characteristic for eucalypts, said composition including soluble salts of the following trace elements in the following ranges of relative proportions of the respective element by weight; from 0.60 to 1.40 copper, from 2.02 to 3.54 zinc, from 4.50 to 10.50 manganese, from 5.36 to 12.50 iron, from 2.00 to 4.66 boron, and from 0.00 to 0.03 molybdenum.

Preferably in this twenty fourth specific form the trace elements are present in the following ranges of relative proportions of the respective element by weight; from 0.75 to 1.25 copper, from 2.15 to 3.16 zinc, from 5.63 to 9.38 manganese, from 6.70 to 11.16 iron, from 2.50 to 4.16 boron and from 0.02 to 0.02 molybdenum.

In a twenty fifth form the invention could be said to reside in a foliar fertiliser composition providing for a substantially consistent enhancement of a crop characteristic for pine trees, said composition including soluble salts of the following trace elements in the following ranges of relative proportions of the respective element by weight; from 0.60 to 1.40 copper, from 4.02 to 9.38 zinc, from 6.30 to 11.97 manganese, from 5.70 to 13.30 iron, from 1.14 to 2.66 boron, and from 0.00 to 0.04 molybdenum.

Preferably in this twenty fifth specific form the trace elements are present in the following ranges of relative proportions of the respective element by weight; from 0.75 to 1.25 copper, from 5.03 to 8.38 zinc, from 7.88 to 11.24 manganese, from 7.13 to 11.88 iron, from 1.43 to 2.38 boron and from 0.02 to 0.04 molybdenum.

In a twenty sixth form the invention could be said to reside in a foliar fertiliser composition providing for a substantially consistent enhancement of a crop characteristic for Protea and Geraldton Wax, said composition including soluble salts of the following trace elements in the following ranges of relative proportions of the respective element by weight; from 0.66 to 1.54 copper, from 2.16 to 5.04 zinc, from 4.56 to 10.64 manganese, from 5.10 to 11.90 iron, from 2.52 to 5.88 boron, and from 0.00 to 0.04 molybdenum.

Preferably in this twenty sixth specific form the trace elements are present in the following ranges of relative proportions of the respective element by weight; from 0.83 to 1.38 copper, from 2.70 to 4.50 zinc, from 5.70 to 9.50 manganese, from 6.38 to 10.63 iron, from 3.15 to 5.25 boron and from 0.02 to 0.04 molybdenum.

In a twenty seventh form the invention could be said to reside in a foliar fertiliser composition providing for a substantially consistent enhancement of a crop characteristic for temperate pastures, said composition including soluble salts of the following trace elements in the following ranges of relative proportions of the respective element by weight; from 0.90 to 2.10 copper, from 3.60 to 8.40 zinc, from 5.10 to 11.90 manganese, from 5.10 to 11.90 iron, from 1.20 to 2.80 boron, and from 0.00 to 0.06 molybdenum.

Preferably in this twenty seventh specific form the trace elements are present in the following ranges of relative proportions of the respective element by weight; from 1.13 to 1.88 copper, from 4.50 to 7.50 zinc, from 6.38 to 10.63 manganese, from 6.38 to 10.63 iron, from 1.50 to 2.50 boron and from 0.03 to 0.05 molybdenum.

The temperate pasture to which the twenty seventh specific form of the invention is to be applied may include a plant selected from the group comprising lucerne, temperate forage grasses and temperate clovers.

In a twenty eighth form the invention could be said to reside in a foliar fertiliser composition providing for a substantially consistent enhancement of a crop characteristic for walnut, said composition including soluble salts of the following trace elements in the following ranges of relative proportions of the respective element by weight; from 1.71 to 3.99 copper, from 4.20 to 9.80 zinc, from 2.50 to 5.84 manganese, from 5.22 to 12.18 iron, from 1.65 to 3.85 boron, and from 0.00 to 0.08 molybdenum.

Preferably in this twenty eighth specific form the trace elements are present in the following ranges of relative proportions of the respective element by weight; from 2.14 to 3.56 copper, from 5.25 to 8.75 zinc, from 3.13 to 5.21 manganese, from 6.53 to 10.88 iron, from 2.06 to 3.44 boron and from 0.05 to 0.08 molybdenum.

In a twenty ninth form the invention could be said to reside in a foliar fertiliser composition providing for a substantially consistent enhancement of a crop characteristic for pineapple, said composition including soluble salts of the following trace elements in the following ranges of relative proportions of the respective element by weight; from 0.51 to 1.19 copper, from 2.70 to 6.30 zinc, from 4.20 to 9.80 manganese, from 6.00 to 14.00 iron, from 1.20 to 2.80 boron, and from 0.00 to 0.42 molybdenum.

Preferably in this twenty ninth specific form the trace elements are present in the following ranges of relative proportions of the respective element by weight; from 0.64 to 1.06 copper, from 3.38 to 5.63 zinc, from 5.25 to 8.75 manganese, from 7.50 to 12.50 iron, from 1.50 to 2.50 boron and from 0.23 to 0.38 molybdenum.

In a thirtieth form the invention could be said to reside in a foliar fertiliser composition providing for a substantially consistent enhancement of a crop characteristic for banana, said composition including soluble salts of the following trace elements in the following ranges of relative proportions of the respective element by weight; from 0.60 to 1.40 copper, from 2.70 to 6.30 zinc, from 5.10 to 11.90 manganese, from 5.40 to 12.60 iron, from 0.60 to 1.40 boron, and from 0.00 to 0.03 molybdenum.

Preferably in this thirtieth specific form the trace elements are present in the following ranges of relative proportions of the respective element by weight; from 075 to 1.25 copper, from 3.38 to 5.63 zinc, from 6.38 to 10.63 manganese, from 6.75 to 11.25 iron, from 0.75 to 1.25 boron and from 0.01 to 0.02 molybdenum.

The compositions will most conveniently be solubilised in water.

It will be understood that the invention includes the composition provided either as a dried mixture to be mixed with water (or other suitable solvent), as a concentrated solution such as 20 grams of dry weight in 100 ml of water, or as a solution ready to apply.

It will be understood that the invention also encompasses the method of applying these compositions to a crop including solubilising the dry composition followed by applying the compositions to the leaves of the crop, usually by spraying, misting or atomising, preferably at the rates referred to herein.

Whilst the present invention may be appropriate for correcting some minor deficiencies the present invention is intended as means of improving characteristics of crops. This is not primarily a method of correcting a marked trace element deficiency of soil but rather an enhancer of yield and/or quality of crops. Where there is a marked deficiency of trace element or elements in the soil to be used, then the imbalance should first be corrected and then the composition according to the invention applied. It will be apparent however in cases of marked deficiency it may also be desired to use essentially a composition according to this invention but modifying the composition to take into account the defect and then apply the composition to both rectify the defect and also improve a crop characteristic.

DETAILED DESCRIPTION OF EXAMPLES OF THE INVENTION

For a better understanding, the invention will now be described with reference to a number of examples. In these examples the percentage of trace elements are expressed as the level of actual trace element in the dry composition, which is subsequently solubilised in water. The form of trace elements are as set out earlier in this specification unless otherwise indicated. The surfactant used is a solid alkyl polyethylene glycol ether sold under the trade name Lutensol™ AT 25 by BASF AG of Germany.

EXAMPLE 1

Potatoes

Two formulations were applied in an aqueous solution to potatoes, c.v. Coliban, in two foliar spray applications at 1.92 kg/ha total trace element per application. Formulation A contained copper (1.26%), zinc (2.52%), manganese (8.82%), iron (ferrous) (8.83%), boron (2.52%) and molybdenum (0.03%), citric acid (1.5%) and a non-ionic surfactant (0.5%). Formulation B contained copper (1.98% w/w), zinc (3.95%), manganese (5.93%), iron (ferrous) (9.89%), boron (1.98%) and molybdenum (0.04%), citric acid (1.5%) and a non-ionic surfactant (0.5%)

The first application was made when plants were about 0.2m high and the second two weeks later. The foliar spray solution was applied at 100 l/ha. The crop was grown in a sandy loam soil with clay subsoil.

A control was not treated. The test contained two replicates of one hectare plots and was harvested and processed commercially.

The applied trace element formulation increased yield and the proportion of the total crop in the most valuable first grade medium size class is shown in the table below.

| Effect of trace element foliar spray on potato quality | | | | | |
|---|---|---|---|---|---|
| | Yield t/ha | Specific gravity | m < 100 g | 100 g < m < 250 g | 250 g < m < 400 g |
| Formulation A | 48.3 | 1.13 | 0.13 | 0.78 | 0.09 |
| Formulation B | 45.8 | 1.12 | 0.06 | 0.53 | 0.41 |
| Control | 45.8 | 1.09 | 0.09 | 0.56 | 0.35 |

It can be seen that Formulation A brought the specific gravity into a desirable range for cooking quality, and the proportion of potatoes within the desirable size range was considerably enhanced. Additionally the yield was also increased. Formulation B enhanced the specific gravity but did not increase the yield or improve the size range of the potatoes.

EXAMPLE 2

Potatoes

Formulations identical to those used in example 1 were applied in solution to three a potato cultivars, Atlantic, Kennebec and Shepody, in one foliar spray application at 5.70 kg/ha total trace elements when the plants were about 0.2 m high. The crop was grown in a deep sandy soil.

A control was sprayed with a commercial formulation at 5.92 kg/ha total trace element containing copper (0.30 kg/ha), manganese (5.38 kg/ha) and boron (0.24 kg/ha), but no zinc or molybdenum. Both formulations were applied in foliar spray solutions at 200 l/ha. The test contained two replicates.

The "test" formulation increased yield in all three cultivars, specific gravity in two cultivars and increased the proportion of the crops in desirable size or mass classes in two cultivars is shown in the tables below.

| | Yield t/ha | Specific gravity | Proportion of crop in various mass classes | | | |
|---|---|---|---|---|---|---|
| (a) cv Atlantic | | | m < 100 g | 100 g < m < 250 g | 250 g < m < 400 g | 400 g < m |
| Formulation A | 58.4 | 1.17 | 0.09 | 0.80 | 0.11 | 0 |
| Formulation B | 58.9 | 1.12 | 0.17 | 0.75 | 0.08 | 0 |
| Control | 53.1 | 1.11 | 0.07 | 0.65 | 0.08 | 0.20 |
| (b) cv Kennebec | | | m < 100 g | 100 g < m < 250 g | 250 g < m < 400 g | 400 g < m |
| Formulation A | 69.5 | 1.13 | 0.09 | 0.40 | 0.37 | 0.14 |
| Formulation B | 67.6 | 1.04 | 0.017 | 0.41 | 0.21 | 0.31 |
| Control | 60.8 | 1.10 | 0.02 | 0.18 | 0.27 | 0.53 |
| (c) cv Shepody | | | m < 100 g | 100 g < m < 250 g | 250 g < m < 400 g | 400 g < m |
| Formulation A | 56.5 | 1.10 | 0.01 | 0.14 | 0.41 | 0.45 |
| Formulation B | 59.5 | 1.07 | 0.05 | 0.17 | 0.35 | 0.43 |
| Control | 49.9 | 1.10 | 0.006 | 0.15 | 0.41 | 0.45 |

EXAMPLE 3

Potatoes

Formulation A was applied in solution to potatoes using as a control no foliar spray, in two different tests, the first test to the cultivar Russet Burbank. The formulation was applied in two applications of 3.60 kg/ha, the first when the crop was 0.2 m high, the second two weeks later. The crop was grown in a sandy loam soil with clay subsoil. The results of the first test are shown in the table below.

| | Total Yield t/ha | Yield t/ha of various mass classes | | | |
|---|---|---|---|---|---|
| | | 0–100 g | 100–250 g | 250–450 g | >450 g |
| Formulatlon A | | | | | |
| total crop | 79.57 | 1.77 | 18.65 | 31.36 | 27.79 |
| processing* | 63.98 | 1.78 | 18.20 | 25.36 | 18.64 |
| Control | | | | | |
| total crop | 68.71 | 1.57 | 13.00 | 20.00 | 34.14 |
| processing* | 38.49 | 1.43 | 11.92 | 13.87 | 11.27 |

(1) processing * This is the portion of the crop that was suitable for processing. Formulation A increased total crop yield and increased the yield of the portion of the crop suitable for processing in all mass classes The second test was using the same formulation, and application rate on Kennebec potatoes.

| | Total Yield t/ha | Yield t/ha of various mass classes | | | |
|---|---|---|---|---|---|
| | | 0–100 g | 100–150 g | 150–280 g | >280 g |
| Formulatlon A | | | | | |
| total crop | 72.40 | 7.90 | 13.40 | 31.90 | 19.20 |

-continued

|  | Total Yield t/ha | Yield t/ha of various mass classes | | | |
| --- | --- | --- | --- | --- | --- |
|  |  | 0–100 g | 100–150 g | 150–280 g | >280 g |
| Control processing* | 59.10 | 28.40 | 14.50 | 14.50 | 1.70 |

Formulation A increased total crop yield and also markedly increased the yield of desirable larger potatoes. Formulation A reduced the incidence of misshapen potatoes which are unsuitable for processing (as for (1) above). It also enhanced the flavour of raw and cooked potatoes as well as the evenness of the colour of the tuber tissue.

EXAMPLE 4

Lucerne Seed Crops

Three different formulations were applied in an aqueous solution to a lucerne (alfalfa) seed crop production in two foliar spray applications. The first application was made when the first flowers were evident and the second 14 days later. All formulations were applied to the crops in foliar sprays at 120 l/ha. The test contained two replicates of each treatment in 0.56 hectare plots.

Formulation A contained copper (1.25% w/w), zinc (6.22%), manganese (3.73%), iron (ferrous) (9.96%), boron (2.49%) and molybdenum (0.06%), citric acid (1.5%) and a non-ionic surfactant (0.5%) and was applied at 1.71 kg/ha total trace element per application.

Formulation B contained copper (2.06% w/w), zinc (6.16%), manganese (3.07%), iron (ferrous) (10.27%), boron (2.09%) and molybdenum (0.00%), citric acid (1.5%) and a non-ionic surfactant (0.5%) and was applied at 1.71 kg/ha total trace element per application.

Formulation C contained copper (1.43% w/w), zinc (4.29%), manganese (2.14%), iron (ferrous) (11.44%), boron (2.89%) and molybdenum (0.07%), citric acid (1.5%) and a non-ionic surfactant (0.5%) and was applied at 1.82 kg/ha total trace element per application.

A control was sprayed with a formulation at 0.38 kg/ha total trace elements containing copper (0.06 kg/ha) and manganese (0.32 kg/ha), which is a common commercial practice on the specific test site because of prior knowledge of positive responses to foliar applied copper and manganese.

The yields for the control and each of the experimental compositions were as follows.

|  | Control | Formulation A | Formulation B | Formulation C |
| --- | --- | --- | --- | --- |
| Yield (t/ha) | 0.45 | 0.50 | 0.49 | 0.42 |
| % change | — | 11.1% | 5.6% | −6.7% |

EXAMPLE 5

Lupins

A formulation containing copper (1.00% w/w), zinc (7.04%), manganese (4.02%), iron (ferrous) (10.05%), boron (2.01%) and molybdenum (0.00%), citric acid (1.5%) and a non-ionic surfactant (0.5%) was applied in aqueous solution to a lupin crop at 1.69 kg/ha total trace element at the first appearance of flowers. The foliar spray solution was applied at 70 l/ha. A control was not treated. The plot size was 0.22 ha.

The formulation increased the yield of grain from 1.67 t/ha (control) to 1.87 t/ha (treated) (+12.0%).

A second test was also conducted using the same formulation, rate and application procedure however this time including molybdenum at 0.07%. In this second test the yield of grain in tonnes per hectare increased from 2.38 t/ha to 2.78 t/ha

EXAMPLE 6

Canola

A formulation containing copper (0.87% w/w), zinc (6.98%), manganese (6.97%), iron (ferrous) (8.71%), boron (1.73%) and molybdenum (0.04%), citric acid (1.5%) and a non-ionic surfactant (0.5%) was applied in aqueous solution to canola at 1.77 kg/ha total race element when the plants had commenced flowering, excepting test 1 where no molybdenum was applied. The foliar spray solution was applied at 100 l/ha.

A control was not treated. The tests used more than one variety of Canola.

|  | Grain Yield t/ha | | |
| --- | --- | --- | --- |
|  | Control | Formulation | Soil Type |
| Test 1 | 2.97 | 3.38 | cracking red-brown earth |
| Test 2 | 2.70 | 3.04 | grey sandy loam |
| Test 3 | 2.22 | 2.48 | red clay-loam |
| Test 4 | 1.69 | 2.16 | solodized solonetz |
| Test 5 | 1.65 | 1.92 | duplex of clay-loam over clay |
| Test 6 | 2.90 | 3.10 | deep red clay |

Plot sizes in the individuals tests ranged from 0.16 to 0.5 hectares.

EXAMPLE 7

Pulses

A formulation containing copper (1.45% w/w), zinc (7.05%), manganese (4.95%), iron (ferrous) (9.87%), boron (1.40%) and molybdenum (0.07%), citric acid (1.5%) and a non-ionic surfactant (0.5%) was applied in aqueous solution to various pulses at 1.24 kg/ha total trace element one week after flowering had commenced. It is to be noted that the same formulations were applied to all tests except for in Faba beans where the formulation included no molybdenum. The foliar spray solution was applied at 100 l/ha. A control was not treated.

|  | Grain Yield t/ha | | |
| --- | --- | --- | --- |
|  | Control | Formulation | Soil Type |
| Faba beans | 1.48 | 1.83 | sandy foam over calcerous loam |
| Chickpea 1 | 1.42 | 1.54 | hard setting red-brown earth |
| Chickpea 2 | 1.84 | 2.04 | deep black self-mulching clay-loam |
| Chickpea 3 | 1.20 | 1.53 | grey self mulching clay |

-continued

| | Control | Formulation | Soil Type |
|---|---|---|---|
| Lentil | 2.48 | 2.88 | grey self mulching clay |
| Field pea 1 | 2.37 | 2.59 | hard setting red-brown earth |
| Field pea 2 | 2.60 | 2.77 | deep black self mulching clay loam |

Grain Yield t/ha

This formulation is also suitable for broad beans in which yield data is not available as a result of destruction of the crop by bird pests attracted specifically to the treated area The formulation was observed to increase sweetness and palatability of the ripening grain. Plot sizes in individual tests range from 0.25 to 0.5 hectares.

It can thus be seen that the application of foliar fertiliser compositions according to this invention to various plant types gives rise to very significant increases in yield and in the case of chickpeas, field peas and faba beans the size of the individual grains was more even and larger than that of the control.

EXAMPLE 8

Corn

A formulation containing copper (1.48% w/w), zinc (6.21%), manganese (5.18%), iron (ferrous) (8.58%), boron (2.51%) and molybdenum (0.06%), citric acid (3.00%) and a non-ionic surfactant (0.5%) was applied in aqueous solution to a corn crop at 1.68 kg/ha total trace element when the crop height was approximately 60 cm. The foliar spray solution was applied at 100 l/ha A control was not treated. The plots had areas from 0.5 to 1.0 ha.

In a first test with an irrigated field the formulation increased the yield of grain from 13.60 t/ha (control) to 15.30 t/ha. In a second test in a dryland crop the formulation increased the yield of grain from 1.14 t/ha (control) to 1.20 t/ha.

EXAMPLE 9

Grapes

A formulation containing copper (1.98% w/w), zinc (3.97%), manganese (6.358%), iron (ferrous) (6.35%), boron (4.56%) and molybdenum (0.03%), citric acid (3.00%) and a non-ionic surfactant (0.5%) was applied in aqueous solution to vineyards at 1.86 kg/ha total trace element at two different stages, firstly before or immediately after flowering, and at the commencement of veraison. The foliar spray solution was applied at 100 l/ha. A control was not treated.

Several tests were conducted. The primary benefit in grapes is not the yield, (although it is believed that yield did increase) but the quality of the fruit and wine made from the fruit It is found that there is a more uniform berry size and a more uniform ripening within bunches. In the juice there is an intensification of bouquet and flavour characteristics in all wine grape varieties treated (cabernet sauvignon, shiraz, riesling, chardonnay, sauvignon blanc, and colombard). So far as it has been possible to test, there has been an improvement in wine quality and intensified bouquet, more complexity of palate and a lengthened palate.

EXAMPLE 10

Cotton

A formulation containing copper (1.34% w/w), zinc (5.62%), manganese (2.81%), iron (ferrous) (10.7%), boron (2.27%) and molybdenum (0.16%), citric acid (3.00%) and a non-ionic surfactant (0.5%) was applied in aqueous solution to a cotton crop at 1.60 kg/ha total trace element at a preflowering stage. The foliar spray solution was applied at 40 l/ha. A control was not treated.

In a first test with an irrigated field the formulation increased the yield of cotton lint from 1.37 t/ha (control) to 1.48 t/ha (test).

EXAMPLE 10

Sugar

A formulation containing copper (1.40% w/w), zinc (5.11%), manganese (7.51%), iron (ferrous) (8.41%), boron (2.00%) and molybdenum (0.03%), citric acid (3.00%) and a non-ionic surfactant (0.5%) was applied in aqueous solution to a sugar crop at 1.96 kg/ha total trace element when the ratoon height was approximately 1 m. The foliar spray solution was applied at 120 l/ha. A control was not treated.

The tests are not at a stage at this time to determine the actual yield per hectare, however preliminary data is available to show that the growth of the plants is more vigorous in treated compared to untreated. Cane samples were taken approximately 5 months after the application of the formulation. The total leaf dryweight was measured in grams per stalk of all leaves positioned apically above the fourth internode (longer than 1 cm) from the top of the stalk. In a first test the control samples had 41.5 g and treated 43.3g, in a second test the control samples had 48.1 g and treated 56.7 g and in a third test the control samples had 45.3 g and treated h ad 55.5 g. Accordingly the preliminary data show that the formulation increased the growth of leaves, and it is expected that with greater leaf formation there will be a greater yield of sugar.

EXAMPLE 12

Tomato

A formulation containing copper (0.95% w/w), zinc (5.02%), manganese (881%), iron (ferrous) (7.58%), boron (2.37%) and molybdenum (0.04%), citric acid (3.00%) and a non-ionic surfactant (0.5%) was applied in aqueous solution to a tomato crop at 1.49 kg/ha total trace element at two different times, the first being at the preflowering stage, and the second approximately two weeks after the first. The foliar spray solution was applied at 60 l/ha$^{-1}$. A control was not treated.

The formulation increased the yield from 111.1 t/ha (control) to 115.7 t/ha (treated. Additionally it improved the crop tolerance to moisture stress, there was less variation in internal conformation of fruit, reduced frequency of white centres in fruit and resulted in a decreased proportion of air spaces within fruit. There was also a general intensification of the red flesh colour which causes intensification of the pinkness in pulp.

EXAMPLE 13

Cereals

A formulation containing copper (2.14% w/w), zinc (5.51%), manganese (8.58%), iron (ferrous) (7.96%), boron (1.1%) and molybdenum (0.04%), citric acid (3.00%) and a non-ionic surfactant (0.5%) was applied in aqueous solution to a wheat crop at 1.52 kg/ha total trace element at mid to late tillering. The foliar spray solution was applied at 70 l/ha$^-$. A control was not treated.

In a first test the formulation increased the yield of grain from 4.48 t/ha (control) to 4.70 t/ha, in a second test the yield increased from 4.81 t/ha (control) to 5.34 t/ha, and in a third test the yield increased from 3.68 t/ha (control) to 4.19 t/ha.

A formulation containing copper (0.93% w/w), zinc (5.76%), manganese (9.86%), iron (ferrous) (8.27%), boron (0.84%) and molybdenum (0.08%), citric acid (3.00%) and a non-ionic surfactant (0.5%) was applied in aqueous solution to rice crops at 2.06 kg/ha total trace element at mid to late tillering. The foliar spray solution was applied at 70 l/ha. A control was not treated.

In a first test the formulation increased the yield of grain from 10.37 t/ha (control) to 11.12 t/ha (test), and in a second test the yield increased from 10.28 t/ha (control) to 11.63 (test).

EXAMPLE 14

Soybean

A formulation containing copper (1.88% w/w), zinc (5.28%), manganese (6.59%), iron (ferrous) (7.54%), boron (2.83%) and molybdenum (0.06%), citric acid (3.00%) and a non-ionic surfactant (0.5%) was applied in aqueous solution to a soybean crop at 1.93 kg/ha total trace element at two different times, the first being at flower bud appearance, and the second approximately two weeks following flower bud appearance. The foliar spray solution was applied at 60 l/ha. A control was not treated.

The formulation increased the yield from 2.65 t/ha (control) to 2.83 t/ha (treated).

EXAMPLE 15

Mung Bean

A formulation containing copper (1.54% w/w), zinc (5.79%), manganese (3.29%), iron (ferrous) (10.17%), boron (2.27%) and molybdenum (0.08%), citric acid (3.00%) and a non-ionic surfactant (0.6%) was applied in aqueous solution to a mung bean crop at 1.62 kg/ha total trace element at preflowering when the first flower buds are evident The foliar spray solution was applied at 70 l/ha. A control was not treated.

The formulation increased the yield from 1.61 t/ha (control) to 1.78 t/ha (treated).

EXAMPLE 16

Citrus

A formulation containing copper (1.18% w/w), zinc (5.92%), manganese (7.45%), iron (ferrous) (7.45%), boron (2.60%) and molybdenum (0.08%), citric acid (3.00%) and a non-ionic surfactant (0.5%) was applied in aqueous solution to mature citrus trees at 2.96 kg/ha total trace element per application at three different times, the first being immediately after fruit set, and two further times respectively six weeks after the first application and six weeks after the second application. The foliar spray solution was applied at 200 l/ha. Controls were not treated. The plots had an area of 0.16 ha.

In a first test the formulation increased the yield of commercially packed whole fruit of Washington Navel oranges from 76.70 t/ha (control) to 78.85 t/ha (treated). In a second test the formulation increased the yield of commercially packed whole fruit of mandarins from 51.45 t/ha (control) to 56.28 t/ha (treated).

Additionally there was an intensification of the flavour characteristics associated with oranges, lemons, mandarins and grapefruit. There was reduced variation of internal conformation of fruit which is most evident in more uniform wall thickness within and between individual fruits and in more even segmentation within fruit.

EXAMPLE 17

Prunus Trees

A formulation containing copper (1.00% w/w), zinc (3.52%), manganese (4.17%), iron (ferrous) (8.34%), boron (1.80%) and molybdenum (0.01%), citric acid (3.00%) and a non-ionic surfactant (0.5%) was applied in aqueous solution to orchards at 1.49 kg/ha total trace element after flowering and during early fruit set. The foliar spray solution was applied at 150 l/ha. Controls were not treated.

Meaningful yield data is not available to date. However in those fruits tested so far, there was an intensification of desirable flavour characteristics associated with each type of fruit tested.

EXAMPLE 18

Brassica Vegetables

A proposed formulation for brassica vegetable is as follows: copper (1.00% w/w), zinc (5.25%), manganese (4.38%), iron (ferrous) (6.25%), boron (2.25%) and molybdenum (0.10%), citric acid (3.00%) and a non-ionic surfactant (0.5%). It is proposed that this formulation be applied at a rate in the range of 1.40 to 2.00 kg/ha per application at least once the first application being made in the juvenile growth stage.

EXAMPLE 19

Sorghum

A proposed formulation for sorghum is as follows: copper (1.00% w/w), zinc (6.00%), manganese (4.60%), iron (ferrous) (9.00%), boron (0.83%) and molybdenum (0.10%), citric acid (3.00%) and a non-ionic surfactant (0.5%). It is proposed that this formulation be applied at a rate in the range of 1.40 to 2.00 kg/ha per application at least once. The first application being made before the plants exceeded 0.5m in height.

EXAMPLE 20

Peanuts

A proposed formulation for peanuts is as follows: copper (1.00% w/w), zinc (5.62%), manganese (7.00%), iron (ferrous) (8.00%), boron (3.50%) and molybdenum (0.08%), citric acid (3.00%) and a non-ionic surfactant (0.5%). It is proposed that this formulation be applied at a rate in the range of 1.40 to 2.00 kg/ha$^{-1}$ per application at least once. The first application being made before the appearance of flower buds.

EXAMPLE 21

Navy Beans

A proposed formulation for navy beans is as follows: copper (1.00% w/w), zinc (2.91%), manganese (4.18%), iron (ferrous) (8.73%), boron (0.91%) and molybdenum (0.13%), citric acid (3.00%) and a non-ionic surfactant (0.5%). It is proposed that this formulation be applied at a rate in the range of 1.40 to 2.00 kg/ha per application at least once. The first application being before the appearance of flower buds.

EXAMPLE 22

Coffee

A proposed formulation for coffee is as follows: copper (2.09% w/w), zinc (2.86%), manganese (6.27%), iron (ferrous) (7.15%), boron (2.50%) and molybdenum (0.02%), citric acid (3.00%) and a non-ionic surfactant (0.5%). It is proposed that this formulation be applied at a rate in the range of 1.40 to 2.00 kg/ha per application at least once. The first application being at the beginning of flower set

EXAMPLE 23

Sunflower

A proposed formulation for a sunflower crop is as follows: copper (2.24% w/w), zinc (7.16%), manganese (3.80%), iron (ferrous) (7.16%), boron (3.36%) and molybdenum (0.04%), citric acid (3.00%) and a non-ionic surfactant (0.5%). It is proposed that this formulation be applied at a rate in the range of 1.40 to 2.00 kg/ha per application at least once. The first application being before the appearance of flower head bud.

EXAMPLE 24

Azuki Beans

A proposed formulation for azuki beans is as follows: copper (1.75% w/w), zinc (4.90%), manganese (3.60%), iron (ferrous) (8.40%), boron (1.93%) and molybdenum (0.09%), citric acid (3.00%) and a non-ionic surfactant (0.5%). It is proposed that this formulation be applied at a rate in the range of 1.40 to 2.00 kg/ha per application at least once. The first application being before the appearance of flower buds.

EXAMPLE 25

Eucalypts

A proposed formulation for eucalypts is as follows: copper (1.00% w/w), zinc (2.53%), manganese (7.50%), iron (ferrous) (8.93%), boron (3.33%) and molybdenum (0.02%), citric acid (3.00%) and a non-ionic surfactant (0.5%). It is proposed that this formulation be applied at a rate in the range of 1.40 to 4.00 kg/ha per application at least once. The formulation can be applied to seedling trees and at any time thereafter, the application preferably being applied at intervals of six months.

EXAMPLE 26

Pine Trees

A proposed formulation for pine trees is as follows: copper (1.00% w/w), zinc (6.70%), manganese (10.50%), iron (ferrous) (9.50%), boron (1.90%) and molybdenum (0.03%), citric acid (3.00%) and a non-ionic surfactant (0.5%). It is proposed that this formulation be applied at a rate in the range of 1.40 to 4.00 kg/ha per application at least once. The formulation can be applied to seedling trees and at any time thereafter, the application preferably being applied at intervals of six months.

EXAMPLE 27

Macadamias

A proposed formulation for Macadamia nuts is as follows: copper (1.00% w/w), zinc (5.50%), manganese (10.00%), iron (ferrous) (7.50%), boron (2.00%) and molybdenum (0.02%), citric acid (3.00%) and a non-ionic surfactant (0.5%). It is proposed that this formulation be applied at a rate in the range of 1.40 to 4.00 kg/ha per application at least once. The formulation can be applied to seedling and non bearing trees. The preferably first application per fruiting cycle to fruit bearing trees to be made at flowering and preferably two additional applications at approximately 6 week intervals thereafter.

EXAMPLE 28

Protea and Geraldton Wax

A proposed formulation for Protea and Geraldton Wax is as follows: copper (1.10% w/w), zinc (3.60%), manganese (7.60%), iron (ferrous) (8.50%), boron (4.20%) and molybdenum (0.03%), citric acid (3.00%) and a non-ionic surfactant (0.5%). It is proposed that this formulation be applied at a rate in the range of 1.40 to 2.00 kg/ha per application at least once. The formulation can be applied to seedling and juvenile plants. The first application to flowering plants being prior to flower bud appearance.

EXAMPLE 29

Temperate Pastures

A proposed formulation for Temperate pastures is as follows: copper (1.50% w/w), zinc (6.00%), manganese (8.50%), iron (ferrous) (8.50%), boron (2.00%) and molybdenum (0.04%), citric acid (3.00%) and a non-ionic surfactant (0.5%). It is proposed that this formulation be applied at a rate in the range of 1.40 to 2.00 kg/ha per application at least once. The formulation being applied when sufficient leaf area is present to intercept a foliar application.

EXAMPLE 30

Walnut

A proposed formulation for Walnut is as follows: copper (2.85% w/w), zinc (7.00%), manganese (4.170%), iron (ferrous) (8.70%), boron (2.75%) and molybdenum (0.06%), citric acid (3.00%) and a non-ionic surfactant (0.5%). It is proposed that this formulation be applied at a rate in the range of 1.40 to 4.00 kg/ha per application at least once. The formulation being first applied per fruiting cycle before flower emergence and preferably for two additional applications at approximately 6 week intervals.

EXAMPLE 31

Pineapple

A proposed formulation for Pineapple is as follows: copper (0.85% w/w), zinc (4.50%), manganese (7.00%), iron (ferrous) (10.00%), boron (2.00%) and molybdenum (0.30%), citric acid (3.00%) and a non-ionic surfactant (0.5%). It is proposed that this formulation be applied at a rate in the range of 1.40 to 4.00 kg/ha per application at least once. The first application being made prior to flowering and subsequent applications preferably separated by approximately 4 weeks.

EXAMPLE 32

Banana

A proposed formulation for Banana is as follows: copper (1.00% w/w), zinc (4.50%), manganese (8.50%), iron (ferrous) (9.00%), boron (1.00%) and molybdenum (0.01%), citric acid (3.00%) and a non-ionic surfactant (0.5%). It is proposed that this formulation be applied at a rate in the range of 1.40 to 4.00 kg/ha per application at least once. The formulation being applied to palm stalks preferably before flower head appearance.

What is claimed is:

1. A method of foliar fertilising a crop solely with a soluble foliar fertiliser composition thereby providing for a substantially consistent enhancement of a crop characteristic in a crop, grown in a range of soil types suitable for cultivation of the crop being nondeficient in trace elements, said crop characteristic selected from the group consisting of yield, increased growth rate, improved flavor characteristics, improved aroma characteristics, increased sweetness, reduced variation in fruit size, more uniform fruit shape, reduced variation in internal structure, more uniform ripening, improved appearance of the fruit, improved color characteristics, improved tolerance to moisture, and combinations thereof, said method including the step of applying the composition to the crop, said composition consisting essentially of soluble compounds of the following trace elements in the following ranges of relative proportions of the respective element by weight, 0.5 to 4.0 copper, 2.0 to 10.0 zinc, 2.5 to 12 manganese, 5 to 14.0 iron, 0.5 to 6.5 boron, and 0 to 0.3 molybdenum.

2. A method of foliar fertilising a crop as in claim 1 wherein between 1.2 kg/ha and 9.0 kg/ha of cumulative elemental weight is delivered.

3. A method of foliar fertilising a crop as in claim 1 wherein between 1.2 kg/ha and 6.0 kg/ha of cumulative elemental weight is delivered.

4. A method of foliar fertilising a crop as in claim 1 wherein between 1.2 kg/ha and 4.0 kg/ha of cumulative elemental weight is delivered.

5. A method of foliar fertilising a crop as in claim 1 wherein the relative proportion by elemental weight of the composition comprising the sum of the zinc and manganese of the above broad form in a range between 8.0 and 16.0.

6. A method of foliar fertilising a crop as in claim 1 wherein the composition includes citric acid to act as a stabiliser in the fertiliser.

7. A method of foliar fertilising a crop as in claim 6 wherein citric acid is present in the composition in a relative percentage by weight of total soluble solids in the range between 0.5 and 4.5.

8. A method of foliar fertilising a crop as in claim 6 wherein citric acid is present in the composition in a relative percentage by weight of total soluble solids in the range between 1.5 and 3.5.

9. A method of foliar fertilising a crop as in claim 1 wherein the composition includes a non-ionic surfactant.

10. A method of foliar fertilising a crop as in claim 9 wherein the non-ionic surfactant is present in the composition in a relative percentage by weight of total soluble solids in the range between 0.25 and 1.5.

11. A method of foliar fertilising a crop as in claim 9 wherein a non-ionic surfactant is present in the composition in a relative percentage by weight of total soluble solids of about 0.4.

12. A method of foliar fertilising a crop as in claim 1 wherein the trace elements are provided in the following form: copper as $CuSO_4.5H_2O$, zinc as $ZnSO_4.1H_2O$, manganese as $MnSO_4.1H_2O$, iron as $FeSO_4.7H_2O$, boron as $H_3BO_3$, and molybdenum as $Na_2MoO_4.2H_2O$.

13. A method of foliar fertilising a crop as in claim 1 wherein the crop is canola and the composition includes soluble compounds of the following trace elements in the following ranges of relative proportions of the respective element by weight, from 0.52 to 1.22 copper, from 6.74 to 10.00 zinc, from 5.23 to 8.71 manganese, from 6.53 to 10.89 iron, from 1.05 to 2.42 boron, and from 0.00 to 0.05 molybdenum.

14. A method of foliar fertilising a crop as in claim 13 wherein copper is proportionately present in the range from 0.65 to 1.09 of elemental weight, and boron is proportionately present within the range from 1.30 to 2.16, of elemental weight in said composition.

15. A method of foliar fertilising a crop as in claim 13 wherein the composition of trace elements are proportionately present in the composition within the following ranges of elemental weight, from 0.77 to 0.97 copper, from 7.9 to 9.70 zinc, from 6.13 to 7.81 manganese, from 7.67 to 9.76 iron, from 1.52 to 1.94 boron, and from 0 to 0.045 molybdenum.

16. A method of foliar fertilising a crop as in claim 1 wherein the crop is a pulse not including lupins, soybeans, mung beans, navy beans and azuki beans, and the composition includes soluble compounds of the following trace elements in the following ranges of relative proportions of the respective element by weight, from 0.84 to 1.96 copper, from 5.29 to 8.81 zinc, from 3.71 to 6.18 manganese, from 7.40 to 12.34 iron, from 0.84 to 1.96 boron, and from 0 to 0.088 molybdenum.

17. A method of foliar fertilising a crop as in claim 16 wherein copper is proportionately present in the range from 1.05 to 1.75 of elemental weight, and boron is proportionately present within the range from 1.05 to 1.75 of elemental weight in said composition.

18. A method of foliar fertilising a crop as in claim 16 wherein the trace elements are proportionately present in the composition within the following ranges from of elemental weight 1.23 to 1.57 copper, from 6.20 to 7.90 zinc, from 4.35 to 5.53 manganese, from 8.68 to 11.05 iron, from 1.23 to 1.57 boron, and from 0 to 0.078 molybdenum.

19. A method of foliar fertilising a crop as in claim 1 wherein the crop is lupin and the composition includes soluble compounds of the following trace elements in the following ranges of relative proportions of the respective element by weight from 0.60 to 1.40 copper, from 5.28 to 8.80 zinc, from 3.02 to 5.03 manganese, from 7.54 to 12.56 iron, from 1.20 to 2.80 boron, and from 0 to 0.088 molybdenum.

20. A method of foliar fertilising a crop as in claim 19 wherein copper is proportionately present in the range from 0.75 to 1.25 of elemental weight, and boron is proportionately present within the range from 1.50 to 2.50 of elemental weight in said composition.

21. A method of foliar fertilising a crop as in claim 19 wherein the trace elements are proportionately present in the composition within the following ranges of elemental weight; from 0.88 to 1.12 copper, from 6.20 to 7.89 zinc, from 3.54 to 4.5 manganese, from 8.84 to 11.26 iron, from 1.76 to 2.24 boron, and from 0 to 0.078 molybdenum.

22. A method of foliar fertilising a crop as in claim 1 wherein the crop is potatoes and the composition includes soluble compounds of the following trace elements in the following ranges of relative proportions of the respective element by weight from 0.76 to 1.76 copper, from 2.00 to 3.15 zinc, from 6.62 to 11.03 manganese, from 6.62 to 11.04 iron, from 1.51 to 3.53 boron, and from 0 to 0.04 molybdenum.

23. A method of foliar fertilising a crop as in claim 22 wherein copper is proportionately present in the range from 0.95 to 1.58 of elemental weight, and boron is proportionately present within the range from 1.89 to 3.15 of elemental weight in said composition.

24. A method of foliar fertilising a crop as in claim 22 wherein the trace elements are proportionately present in said composition within the following ranges of elemental weight; from 1.11 to 1.41 copper, from 2.22 to 2.82 zinc, from 7.76 to 9.88 manganese, from 7.77 to 9.89 iron, from 2.22 to 2.82 boron, and from 0 to 0.034 molybdenum.

25. A method of foliar fertilising a crop as in claim 1 wherein the crop is a lucerne seed crop and the composition includes soluble compounds of the following trace elements in the following ranges of relative proportions of the respective element by weight; from 0.75 to 2.40 copper, from 4.67 to 7.78 zinc, from 2.80 to 4.66 manganese, from 7.47 to 12.45 iron, from 1.49 to 3.49 boron, and from 0 to 0.075 molybdenum.

26. A method of foliar fertilising a crop as in claim 25 wherein copper is proportionately present in the range from 0.94 to 2.10 of elemental weight, and of boron is proportionately present within the range from 1.87 to 3.11 of elemental weight in said composition.

27. A method of foliar fertilising a crop as in claim 25 wherein the trace elements are proportionately present in said composition within the following ranges of elemental weight; from 1.1 to 1.4 copper, from 5.47 to 6.97 zinc, from 3.00 to 4.18 manganese, from 8.77 to 11.16 iron, from 2.05 to 2.79 boron, and from 0 to 0.067 molybdenum.

28. A method of foliar fertilising a crop as in claim 1 wherein the crop is corn and the composition includes soluble compounds of the following trace elements in the following ranges of relative proportions of the respective element by weight; from 0.6 to 1.40 copper, from 2.52 to 5.88 zinc, from 2.56 to 4.90 manganese, from 5.05 to 8.12 iron, from 1.02 to 2.38 boron, and from 0 to 0.06 molybdenum.

29. A method of foliar fertilising a crop as in claim 28 wherein trace elements are present in said composition in the following ranges of relative proportions of the respective element by weight; from 0.75 to 1.25 copper, from 3.15 to 5.25 zinc, from 2.98 to 4.38 manganese, from 5.34 to 7.25 iron, from 1.28 to 2.13 boron and from 0.03 to 0.05 molybdenum.

30. A method of foliar fertilising a crop as in claim 1 wherein the crop is grape vines and the composition includes soluble compounds of the following trace elements in the following ranges of relative proportions of the respective element by weight; from 1.0 to 2.34 copper, from 2.0 to 4.66 zinc, from 3.2 to 7.46 manganese, from 5.04 to 8.40 iron, from 2.3 to 5.36 boron, and from 0 to 0.03 molybdenum.

31. A method of foliar fertilising a crop as in claim 30 wherein the trace elements are present in said composition in the following ranges of relative proportions of the respective element by weight; from 1.25 to 2.09 copper, from 2.5 to 4.16 zinc, from 4.0 to 6.66 manganese, from 5.52 to 7.50 iron, from 2.87 to 4.79 boron and from 0.01 to 0.03 molybdenum.

32. A method of foliar fertilising a crop as in claim 1 wherein the crop is cotton and the composition includes soluble compounds of the following trace elements in the following ranges of relative proportions of the respective element by weight; from 0.8 to 1.86 copper, from 3.36 to 7.84 zinc, from 2.50 to 5.82 manganese, from 6.0 to 14.0 iron, from 1.36 to 3.18 boron, and from 0 to 0.17 molybdenum.

33. A method of foliar fertilising a crop as in claim 32 wherein the trace elements are present in the composition in the following ranges of relative proportions of the respective element by weight; from 1.0 to 1.66 copper, from 4.2 to 7.0 zinc, from 3.12 to 5.2 manganese, from 7.5 to 12.5 iron, from 0.09 to 0.15 boron and from 0.03 to 0.05 molybdenum.

34. A method of foliar fertilising a crop as in claim 1 wherein the crop is sugar cane and the composition includes soluble compounds of the following trace elements in the following ranges of relative proportions of the respective element by weight; from 0.6 to 1.40 copper, from 3.6 to 8.4 zinc, from 4.2 to 9.8 manganese, from 5.4 to 12.6 iron, from 0.81 to 1.89 boron, and from 0 to 0.07 molybdenum.

35. A method of foliar fertilising a crop as in claim 34 wherein Me trace elements are present in the following ranges of relative proportions of the respective element by weight; from 0.75 to 1.25 copper, from 4.5 to 7.5 zinc, from 5.25 to 8.75 manganese, from 6.75 to 11.25 iron, from 1.01 to 1.69 boron and from 0.02 to 0.04 molybdenum.

36. A method of foliar fertilising a crop as in claim 1 wherein the crop is tomato and the composition includes soluble compounds of the following trace elements in the following ranges of relative proportions of the respective element by weight; from 0.6 to 1.40 copper, from 3.18 to 7.42 zinc, from 5.58 to 12.0 manganese, from 5.04 to 11.2 iron, from 1.50 to 3.5 boron, and from 0 to 0.07 molybdenum.

37. A method of foliar fertilising a crop as in claim 36 wherein the trace elements are present in the composition in the following ranges of relative proportions of the respective element by weight; from 0.75 to 1.25 copper, from 3.98 to 6.63 zinc, from 6.98 to 10.7 manganese, from 6.0 to 10.0 iron, from 1.88 to 3.13 boron and from 0.04 to 0.06 molybdenum.

38. A method of foliar fertilising a crop as in claim 1 wherein the crop is a cereal and the composition includes soluble compounds of the following trace elements in the following ranges of relative proportions of the respective element by weight; from 0.95 to 3.26 copper, from 3.3 to 7.43 zinc, from 5.52 to 11.96 manganese, from 5.03 to 9.75 iron, from 0.5 to 0.91 boron, and from 0 to 0.06 molybdenum.

39. A method of foliar fertilising a crop as in claim 38 wherein the trace elements are present in the composition the following ranges of relative proportions of the respective element by weight; from 1.58 to 2.63 copper, from 4.13 to 6.88 zinc, from 6.9 to 11.5 manganese, from 6.0 to 9.38 iron, from 0.57 to 0.81 boron and from 0.03 to 0.05 molybdenum.

40. A method of foliar fertilising a crop as in claim 38 wherein the cereal is selected from the group consisting of wheat, barley, rice, oats, cereal rye and triticale.

41. A method of foliar fertilising a crop as in claim 1 wherein the crop is soybean and the composition includes soluble compounds of the following trace elements in the following ranges of relative proportions of the respective element by weight; from 0.88 to 2.04 copper, from 3.05 to 7.11 zinc, from 2.83 to 6.61 manganese, from 6.0 to 14.0 iron, from 2.05 to 4.77 boron, and from 0 to 0.08 molybdenum.

42. A method of foliar fertilising a crop as in claim 41 wherein the trace elements are present in the composition in the following ranges of relative proportions of the respective element by weight; from 1.10 to 1.83 copper, from 3.81 to 6.35 zinc, from 3.54 to 5.90 manganese, from 7.50 to 12.50 iron, from 2.56 to 4.26 boron and from 0.04 to 0.07 molybdenum.

43. A method of foliar fertilising a crop as in claim 1 wherein the crop is mung bean and the composition includes soluble compounds of the following trace elements in the following ranges of relative proportions of the respective element by weight; from 1.50 to 3.50 copper, from 4.16 to 9.72 zinc, from 2.50 to 5.84 manganese, from 5.91 to 13.79 iron, from 1.85 to 4.33 boron, and from 0.00 to 0.28 molybdenum.

44. A method of foliar fertilising a crop as in claim 43 wherein the trace elements are present in the composition in the following ranges of relative proportions of the respective element by weight; from 1.88 to 3.13 copper, from 5.21 to 8.68 zinc, from 3.13 to 5.21 manganese, from 7.39 to 12.31 iron, from 2.32 to 3.86 boron and from 0.15 to 0.25 molybdenum.

45. A method of foliar fertilising a crop as in claim 1 wherein the crop is citrus and the composition includes soluble compounds of the following trace elements in the following ranges of relative proportions of the respective element by weight; from 0.60 to 1.40 copper, from 3.78 to 8.82 zinc, from 3.90 to 9.10 manganese, from 5.07 to 9.10 iron, from 1.32 to 3.08 boron, and from 0.00 to 0.12 molybdenum.

46. A method of foliar fertilising a crop as in claim 45 wherein the trace elements are present in the composition in the following ranges of relative proportions of the respective element by weight; from 0.75 to 1.25 copper, from 4.73 to 7.88 zinc, from 4.88 to 8.13 manganese, from 5.85 to 8.13 iron, from 1.65 to 2.75 boron and from 0.06 to 0.10 molybdenum.

47. A method of foliar fertilising a crop as in claim 1 wherein the crop is a brassica vegetable and the composition includes soluble compounds of the following trace elements in the following ranges of relative proportions of the respective element by weight; from 0.60 to 1.40 copper, from 3.15 to 7.35 zinc, from 2.63 to 6.13 manganese, from 5.00 to 8.75 iron, from 1.35 to 3.15 boron, and from 0.00 to 0.20 molybdenum.

48. A method of foliar fertilising a crop as in claim 47 wherein the trace elements are present in the composition in the following ranges of relative proportions of the respective element by weight; from 0.75 to 1.25 copper, from 3.94 to 6.56 zinc, from 3.29 to 5.48 manganese, from 5.63 to 7.81 iron, from 1.69 to 2.81 boron and from 0.07 to 0.13 molybdenum.

49. A method of foliar fertilising a crop as in claim 47 wherein the brassica vegetable is selected from the group consisting of broccoli, cabbage, cauliflower and brussel sprouts.

50. A method of foliar fertilising a crop as in claim 1 wherein the crop is sorghum and the composition includes soluble compounds of the following trace elements in the following ranges of relative proportions of the respective element by weight; from 0.60 to 1.40 copper, from 3.60 to 8.40 zinc, from 2.76 to 6.44 manganese, from 5.40 to 12.60 iron, from 0.50 to 1.80 boron, and from 0 to 0.14 molybdenum.

51. A method of foliar fertilising a crop as in claim 50 wherein the trace elements are present in the composition in the following ranges of relative proportions of the respective element by weight; from 0.75 to 1.25 copper, from 4.50 to 7.50 zinc, from 3.45 to 5.75 manganese, from 6.75 to 11.25 iron, from 0.62 to 1.33 boron and from 0.08 to 0.13 molybdenum.

52. A method of foliar fertilising a crop as in claim 1 wherein the crop is peanuts and the composition includes soluble compounds of the following trace elements in the following ranges of relative proportions of the respective element by weight; from 0.60 to 1.40 copper, from 3.37 to 7.87 zinc, from 4.20 to 9.80 manganese, from 5.04 to 11.20 iron, from 2.10 to 4.90 boron, and from 0.00 to 0.1 molybdenum.

53. A method of foliar fertilising a crop as in claim 52 wherein the trace elements are present in the composition in the following ranges of relative proportions of the respective element by weight; from 0.75 to 1.25 copper, from 4.22 to 7.03 zinc, from 5.25 to 8.75 manganese, from 6.00 to 10.00 iron, from 2.63 to 4.38 boron and from 0.06 to 0.10 molybdenum.

54. A method of foliar fertilising a crop as in claim 1 wherein the crop is navy beans and the composition includes soluble compounds of the following trace elements in the following ranges of relative proportions of the respective element by weight; from 0.60 to 1.40 copper, from 2.01 to 4.07 zinc, from 2.51 to 5.85 manganese, from 5.24 to 12.22 iron, from 0.55 to 1.27 boron, and from 0 to 0.18 molybdenum.

55. A method of foliar fertilising crop as in claim 54 wherein the trace elements are present in the composition in the following ranges of relative proportions of the respective element by weight; from 0.75 to 1.25 copper, from 2.47 to 3.64 zinc, from 3.14 to 5.23 manganese, from 6.55 to 10.91 iron, from 0.68 to 1.14 boron and from 0.10 to 0.16 molybdenum.

56. A method of foliar fertilising a crop as in claim 1 wherein the crop is macadamias and the composition includes soluble compounds of the following trace elements in the following ranges of relative proportions of the respective element by weight; from 0.6 to 1.40 copper, from 3.30 to 7.70 zinc, from 6.00 to 12.00 manganese, from 5.03 to 10.50 iron, from 1.20 to 2.80 boron, and from 0 to 0.03 molybdenum.

57. A method of foliar fertilising a crop as in claim 56 wherein the trace elements are present in the composition in the following ranges of relative proportions of the respective element by weight; from 0.75 to 1.25 copper, from 4.13 to 6.88 zinc, from 7.50 to 11.00 manganese, from 5.63 to 9.38 iron, from 1.50 to 2.50 boron and from 0.02 to 0.03 molybdenum.

58. A method of foliar fertilising a crop as in claim 1 wherein the crop is coffee and the composition includes soluble compounds of the following trace elements in the following ranges of relative proportions of the respective element by weight; from 1.46 to 2.72 copper, from 2.00 to 3.72 zinc, from 4.39 to 8.15 manganese, from 5.01 to 9.30 iron, from 1.75 to 3.25 boron, and from 0 to 0.04 molybdenum.

59. A method of foliar fertilising a crop as in claim 58 wherein the trace elements are present in the composition in the following ranges of relative proportions of the respective element by weight; from 1.67 to 2.51 copper, from 2.29 to 3.43 zinc, from 5.02 to 7.52 manganese, from 5.72 to 8.58 iron, from 2.00 to 3.00 boron and from 0.01 to 0.03 molybdenum.

60. A method of foliar fertilising a crop as in claim 1 wherein the crop is from a prunus tree and the composition includes soluble compounds of the following trace elements in the following ranges of relative proportions of the respective element by weight; from 0.60 to 1.40 copper, from 2.10 to 4.90 zinc, from 2.50 to 5.84 manganese, from 5.00 to 11.68 iron, from 1.08 to 2.52 boron, and from 0.00 to 0.01 molybdenum.

61. A method of foliar fertilising a crop as in claim 60 wherein the trace elements are present in the composition in the following ranges of relative proportions of the respective element by weight; from 0.75 to 1.25 copper, from 2.63 to 4.38 zinc, from 3.13 to 5.21 manganese, from 6.26 to 10.43 iron, from 1.35 to 2.25 boron and from 0.00 to 0.01 molybdenum.

62. A method of foliar fertilising a crop as in claim 60 wherein the prunus tree is selected from the group consisting of plum, cherry, peach, apricot, nectarine, peacharine and almond.

63. A method of foliar fertilising a crop as in claim 1 wherein the crop is sunflower and the composition includes soluble compounds of the following trace elements in the following ranges of relative proportions of the respective element by weight; from 1.57 to 2.91 copper, from 5.01 to 9.31 zinc, from 2.66 to 4.94 manganese, from 5.01 to 9.31 iron, from 2.35 to 4.37 boron, and from 0.00 to 0.05 molybdenum.

64. A method of foliar fertilising a crop as in claim 63 wherein the trace elements are present in the composition in the following ranges of relative proportions of the respective element by weight; from 1.79 to 2.69 copper, from 5.73 to 8.59 zinc, from 3.04 to 4.56 manganese, from 5.73 to 8.59 iron, from 2.69 to 4.03 boron and from 0.03 to 0.05 molybdenum.

65. A method of foliar fertilising a crop as in claim 1 wherein the crop is azuki bean and the composition includes soluble compounds of the following trace elements in the following ranges of relative proportions of the respective element by weight; from 1.23 to 2.28 copper, from 3.43 to 6.37 zinc, from 2.52 to 4.68 manganese, from 5.88 to 10.92 iron, from 1.35 to 2.51 boron, and from 0.00 to 0.12 molybdenum.

66. A method of foliar fertilising a crop as in claim 65 wherein the trace elements are present in the composition in the following ranges of relative proportions of the respective element by weight; from 1.40 to 2.10 copper, from 3.92 to 5.88 zinc, from 2.88 to 4.32 manganese, from 6.72 to 10.08 iron, from 1.54 to 2.32 boron and from 0.07 to 0.11 molybdenum.

67. A method of foliar fertilising a crop as in claim 1 wherein the crop is from a eucalyptus species and the composition includes soluble compounds of the following trace elements in the following ranges of relative proportions of the respective element by weight; from 0.60 to 1.40 copper, from 2.02 to 3.54 zinc, from 4.50 to 10.50 manganese, from 5.36 to 12.50 iron, from 2.00 to 4.66 boron, and from 0.00 to 0.03 molybdenum.

68. A method of foliar fertilising a crop as in claim 67 wherein the trace elements are present in the composition in the following ranges of relative proportions of the respective element by weight; from 0.75 to 1.25 copper, from 2.15 to 3.16 zinc, from 5.63 to 9.38 manganese, from 6.70 to 11.16 iron, from 2.50 to 4.16 boron and from 0.02 to 0.02 molybdenum.

69. A method of foliar fertilising a crop as in claim 1 wherein the crop is derived from a pine tree and the composition includes soluble compounds of the following trace elements in the following ranges of relative proportions of the respective element by weight; from 0.60 to 1.40 copper, from 4.02 to 9.38 zinc, from 6.30 to 11.97 manganese, from 5.70 to 13.30 iron, from 1.14 to 2.66 boron, and from 0.00 to 0.04 molybdenum.

70. A method of foliar fertilising a crop as in claim 69 wherein the trace elements are present in the composition in the following ranges of relative proportions of the respective element by weight; from 0.75 to 1.25 copper, from 5.03 to 8.38 zinc, from 7.88 to 11.24 manganese, from 7.13 to 11.88 iron, from 1.43 to 2.38 boron and from 0.02 to 0.04 molybdenum.

71. A method of foliar fertilising a crop as in claim 1 wherein the crop is protea or geraldton wax and the composition includes soluble compounds of the following trace elements in the following ranges of relative proportions of the respective element by weight; from 0.66 to 1.54 copper, from 2.16 to 5.04 zinc, from 4.56 to 10.64 manganese, from 5.10 to 11.90 iron, from 2.52 to 5.88 boron, and from 0.00 to 0.04 molybdenum.

72. A method of foliar fertilising a crop as in claim 71 wherein the trace elements are present in the composition in the following ranges of relative proportions of the respective element by weight; from 0.83 to 1.38 copper, from 2.70 to 4.50 zinc, from 5.70 to 9.50 manganese, from 6.38 to 10.63 iron, from 3.15 to 5.25 boron and from 0.02 to 0.04 molybdenum.

73. A method of foliar fertilising a crop as in claim 1 wherein the crop is derived as from a temperate pasture and the composition includes soluble compounds of the following trace elements in the following ranges of relative proportions of the respective element by weight; from 0.90 to 2.10 copper, from 3.60 to 8.40 zinc, from 5.10 to 11.90 manganese, from 5.10 to 11.90 iron, from 1.20 to 2.80 boron, and from 0.00 to 0.06 molybdenum.

74. A method of foliar fertiliser a crop as in claim 73 wherein the trace elements are present in the composition in the following ranges of relative proportions of the respective element by weight; from 1.13 to 1.88 copper, from 4.50 to 7.50 zinc, from 6.38 to 10.63 manganese, from 6.38 to 10.63 iron, from 1.50 to 2.50 boron and from 0.03 to 0.05 molybdenum.

75. A method of foliar fertilising a crop as in claim 73 wherein the temperate pasture includes a plant selected from the group consisting of lucerne, temperate forage grasses and temperate clovers.

76. A method of foliar fertilising a crop as in claim 1 wherein the crop is walnut and the composition includes soluble compounds of the following trace elements in the following ranges of relative proportions of the respective element by weight; from 1.71 to 3.99 copper, from 4.20 to 9.80 zinc, from 2.50 to 5.84 manganese, from 5.22 to 12.18 iron, from 1.65 to 3.85 boron, and from 0.00 to 0.08 molybdenum.

77. A method of foliar fertilising a crop as in claim 76 wherein the trace elements are present in the composition in the following ranges of relative proportions of the respective element by weight; from 2.14 to 3.56 copper, from 5.25 to 8.75 zinc, from 3.13 to 5.21 manganese, from 6.53 to 10.88 iron, from 2.06 to 3.44 boron and from 0.05 to 0.08 molybdenum.

78. A method of foliar fertilising a crop as in claim 1 wherein the crop is pineapple and the composition includes soluble compounds of the following trace elements in the following ranges of relative proportions of the respective element by weight; from 0.51 to 1.19 copper, from 2.70 to 6.30 zinc, from 4.20 to 9.80 manganese, from 6.00 to 14.00 iron, from 1.20 to 2.80 boron, and from 0.00 to 0.42 molybdenum.

79. A foliar fertiliser composition as in claim 78 wherein the trace elements are present in the composition in the following ranges of relative proportions of the respective element by weight; from 0.64 to 1.06 copper, from 3.38 to 5.63 zinc, from 5.25 to 8.75 manganese, from 7.50 to 12.50 iron, from 1.50 to 2.50 boron and from 0.23 to 0.38 molybdenum.

80. A method of foliar fertilising a crop as in claim 1 wherein the crop is banana and the composition includes soluble compounds of the following trace elements in the following ranges of relative proportions of the respective element by weight; from 0.60 to 1.40 copper, from 2.70 to 6.30 zinc, from 5.10 to 11.90 manganese, from 5.40 to 12.60 iron, from 0.60 to 1.40 boron, and from 0.00 to 0.03 molybdenum.

81. A method of foliar fertilising a crop as in claim 80 wherein the trace elements are present in the composition in the following ranges of relative proportions of the respective element by weight; from 0.75 to 1.25 copper, from 3.38 to 5.63 zinc, from 6.38 to 10.63 manganese, from 6.75 to 11.25 iron, from 0.75 to 1.25 boron and from 0.01 to 0.02 molybdenum.

* * * * *